R. J. & B. J. O'NEILL.
CAR BRAKE MECHANISM.
APPLICATION FILED OCT. 11, 1913.
1,184,119.
Patented May 23, 1916.
2 SHEETS—SHEET 1.
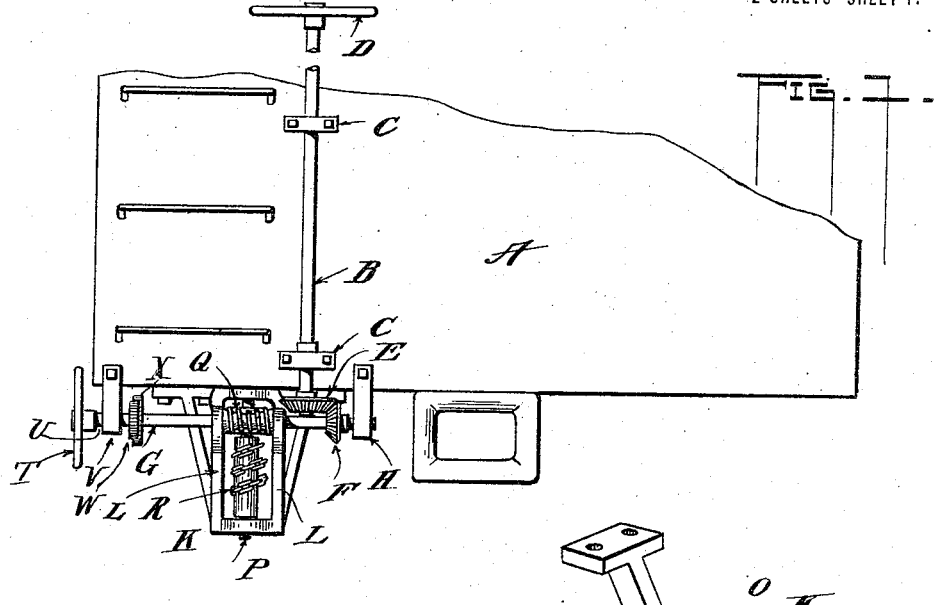
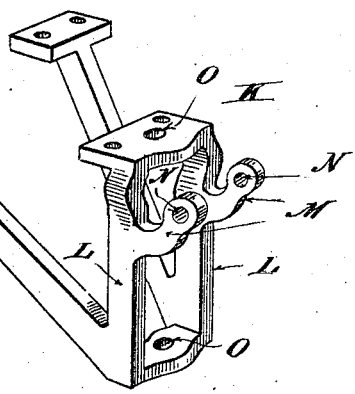
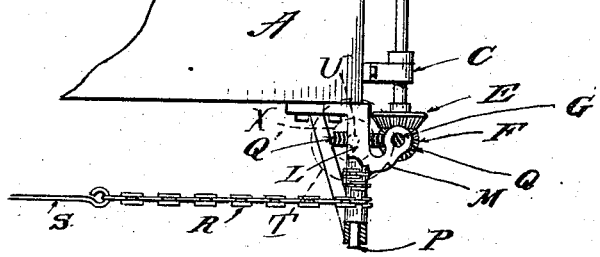
Witnesses:
Marie Dacey
Inventors:
Richard J. O'Neill,
Bryan J. O'Neill,
By L. N. Thurlow
Atty.

R. J. & B. J. O'NEILL.
CAR BRAKE MECHANISM.
APPLICATION FILED OCT. 11, 1913.
1,184,119.
Patented May 23, 1916.
2 SHEETS—SHEET 2.
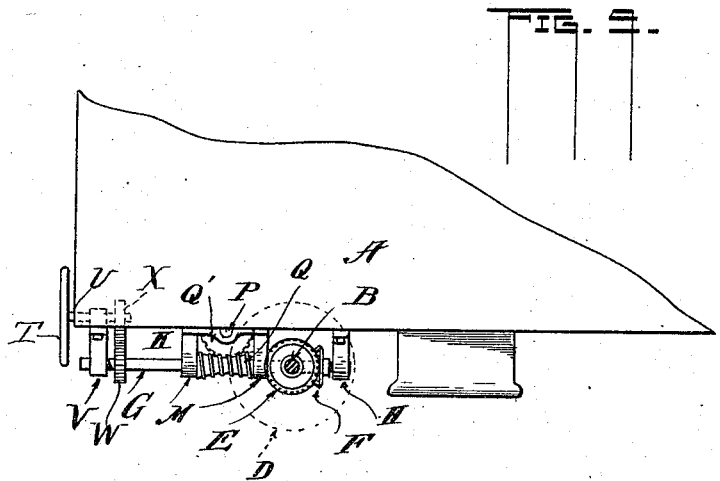
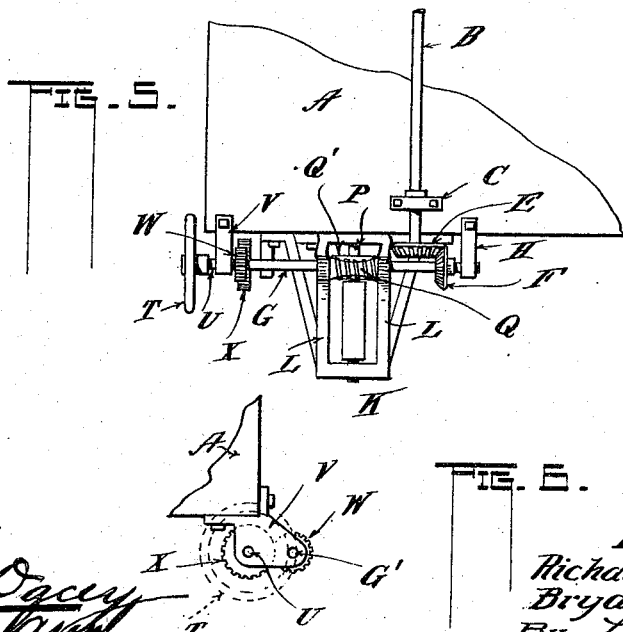
Witnesses:
Inventors:
Richard J. O'Neill,
Bryan J. O'Neill,
By L. M. Thurlow
Atty.

UNITED STATES PATENT OFFICE.

RICHARD J. O'NEILL, OF DENVER, COLORADO, AND BRYAN J. O'NEILL, OF PEORIA, ILLINOIS.

CAR-BRAKE MECHANISM.

1,184,119.   Specification of Letters Patent.   Patented May 23, 1916.

Application filed October 11, 1913. Serial No. 794,710.

*To all whom it may concern:*

Be it known that I, RICHARD J. O'NEILL, of the city of Denver, county of Denver, and State of Colorado, and BRYAN J. O'NEILL, of Peoria, county of Peoria, and State of Illinois, citizens of the United States, have invented certain new and useful Improvements in Car-Brake Mechanism; and we do hereby declare that the following is a full, clear, and exact description of the invention, which will enable others skilled in the art to which it appertains to make and use the same.

This invention relates to a brake mechanism and pertains particularly to mechanism for operating car brakes.

An object of the invention is to produce a mechanism for operating the brakes of railroad cars, particularly freight cars, in which the power used in setting the brakes is gained through a worm and worm-wheel structure.

Another object is to construct a mechanism for operating a car brake in which a worm and worm-wheel gearing is employed together with certain gearing the wheels of which bear such a relation to one another that the brake shoes may be brought against the wheels or released with the fewest number of turns of the hand wheel or operating wheel.

Another object is to construct a brake operating mechanism including a part that may be operated by a person standing on the top of the car, and a part which may be operated also at the side of the car by a person on the ground.

To the end that the invention may be clearly understood we have provided the accompanying drawings, wherein, Figure 1 is an end elevation of a portion of a car showing the brake operating mechanism. Fig. 2 is a side elevation of a portion of the end of a car also showing the brake mechanism, certain parts being shown only in dotted lines. Fig. 3 shows a bracket constituting bearings for certain shafts. Fig. 4 is a plan of a portion of the end of a car showing the brake mechanism, and Figs. 5 and 6 are details of the said mechanism.

A indicates the car.

B is the usual vertical brake-staff, or shaft, mounted at the end of the car in journals C and provided at its upper end with the usual hand wheel D and its lower end is provided with a beveled gear E. In mesh with the gear E is a beveled pinion F fixed on a shaft G extending at right angles to the said shaft B and supported from the car by suitable bearing-brackets or hangers H, V.

U is a stub shaft lying parallel to the shaft G and mounted in the bearing V. It is provided at its outer end with a hand wheel T and is also provided with a gear X in mesh with a pinion W secured on the shaft G. This is most clearly shown in Figs. 4 and 6.

K represents, as a whole, a casting comprising an upright portion L having a pair of arms M extending from it provided each with a hole N in its extremity and creating bearings for the shaft G in addition to the bearings H, V described. This said casting K is secured to the under side of the car in any suitable manner and its upper and lower portions are provided with holes O to receive an upright shaft P which may be termed a worm-wheel shaft, there being a worm-wheel Q' affixed to it which is in mesh with a worm Q secured on the shaft G between the described arms M. The worm-wheel shaft within the frame L constitutes a drum upon which the brake chain R, Fig. 2, is adapted to wind, said chain having connection with the usual brake-rod S connected to the brake-lever mechanism not shown.

While the described structure is shown extending from the end of the car, see Figs. 2 and 4, the parts may be otherwise disposed so as to lie under the car out of the way of persons working about the car and to avoid being broken or disarranged by striking obstructions, but this is all within the invention. The disposition of the parts for convenience' sake and for safety readily suggesting itself to the manufacturer.

In operation the rotation of the hand wheel D results in imparting rotation to the worm Q which in turn rotates the worm-wheel Q' and its shaft P which constitutes a winding drum for the chain R described. The diameter of the shaft forming the winding drum may be such that a partial rotation of the worm wheel will impart the required amount of movement to fully tighten or loosen the brake shoes not shown. That is to say, the drum may be of such a diameter that but a comparatively few revolutions of the worm Q will be required to impart the needed movement to the worm-wheel and shaft P. Again, due to the relation of the gear E to the pinion F the number of turns of the hand wheel D can be reduced from the revolutions required for the worm.

As is well known a worm operating upon a worm-wheel results in great ease of action considering the power that can be produced, and in connection with a brake the advantages are still greater from the fact that the form and worm-wheel cannot move voluntarily relatively to one another and thus no pawl and ratchet mechanism is required, the worm and worm wheel forming the required lock. When, therefore, the brake shoes are set their release cannot occur except by manual effort.

The relation of the beveled gear E to the beveled pinion F and the relation of the gear X to the pinion W are substantially identical so that in turning either hand wheel D T the rotation of the shaft G will be much faster than the stub shaft U or the shaft B which is one of the desires and aims of the invention. One advantage in this construction, that is to say, the use of the hand wheel T on the stub shaft that will rotate the worm shaft at a high speed, is that the operator in running along beside the car in motion can readily take up the slack in the brake chains and set the brakes in a much shorter time than though the hand wheel were affixed to the worm shaft. Added to this advantage of quickly setting the brakes from the ground or from the top of the car is that of the use of a worm and worm wheel which obviates the necessity of using such means as a pawl and ratchet to prevent the retrograde movement of the winding drum.

Having described the invention we claim:—

1. In a brake for railway cars, the combination of a winding drum suitably journaled on the car, a worm wheel fixed relative to it, a shaft including a worm engaging the worm wheel, a gear fixed relative to the shaft, a vertically disposed shaft provided with a gear in mesh with the first gear and of larger size than said first gear, said shaft extending to the top of the car, a third shaft including an operating means lying at the side of the car, and intermeshing gearing carried by the first and third described shafts, the said third described shaft due to said gearing adapted to impart a speed of rotation to the said first described shaft greater than the speed of its own rotation.

2. In a brake for railway cars, the combination with a winding drum suitably journaled, a worm wheel fixed relative to it, a worm engaging the worm wheel, a pair of pinions fixed relative to the worm, an operating means including a gear adapted to mesh with one of the said pinions, and a second operating means including a gear in mesh with the other pinion of the pair, one of the said operating means lying at the top of the car and the other at the side of the same.

3. In a brake for railway cars, the combination with a drum suitably journaled on the car, a worm wheel fixed relative to the same, a shaft including a worm in mesh with the worm wheel, a gear wheel fixed on the shaft, a second shaft including an operating means affixed to it and having a gear wheel larger than the first gear, a third shaft including a rotatable operating means, and gearing carried by the same and operatively engaging the first described shaft and adapted by means of said gearing to impart a speed of rotation to the same greater than its own speed of rotation.

In testimony whereof we affix our signatures, in presence of two witnesses.

RICHARD J. O'NEILL.
BRYAN J. O'NEILL.

Witnesses:
L. E. SUTHERLAND,
L. M. THURLOW.

Copies of this patent may be obtained for five cents each, by addressing the "Commissioner of Patents, Washington, D. C."